tag"US005712657A

United States Patent [19]
Eglit et al.

[11] Patent Number: 5,712,657
[45] Date of Patent: Jan. 27, 1998

[54] METHOD AND APPARATUS FOR ADAPTIVE DITHERING

[75] Inventors: Alexander Julian Eglit, San Carlos; Robin Sungsop Han, Saratoga, both of Calif.

[73] Assignee: Cirrus Logic, Inc., Fremont, Calif.

[21] Appl. No.: 412,158

[22] Filed: Mar. 28, 1995

[51] Int. Cl.$^6$ .................................................. G09G 5/10
[52] U.S. Cl. ........................................... 345/147; 345/149
[58] Field of Search ................................... 345/147, 149, 345/89; 358/455–457

[56] References Cited

U.S. PATENT DOCUMENTS

| | | | |
|---|---|---|---|
| 3,562,420 | 2/1971 | Thompson et al. | 348/607 |
| 4,725,833 | 2/1988 | Nakamura | 345/147 |
| 4,733,230 | 3/1988 | Kurihara et al. | 345/147 |
| 5,424,755 | 6/1995 | Lucas et al. | 345/155 |

OTHER PUBLICATIONS

*Second Edition Computer Graphics Principles and Practice*, James D. Foley, Andries van Dam, Steven K. Feiner and John F. Hughes, Addison–Wesley Publishing Co., copyright 1987, Cornell University, Program of Computer Graphics, (pp. 563–573).
*The Art of Digital Video, Second Edition*, John Watkinson, copyright 1990, 1994, British Library Cataloguing in Publication Data, Library of Congress Cataloging in Publication Data, (pp. 139–147).

*Primary Examiner*—Richard Hjerpe
*Assistant Examiner*—Vui T. Tran
*Attorney, Agent, or Firm*—Gerald T. Sekimura; Alan S. Hodes; Steven A. Shaw

[57] ABSTRACT

An adaptive dithering apparatus analyzes an input video signal as a function of available primary shades and produces a select signal whose value is a function of the desired shade represented by the input video signal and of the available primary shades. A combiner combines the input video signal with a selected one of a plurality of dither signals to generate a dithered input video signal. The one dither signal is selected under the control of the select signal. Finally, an adjustor receives the dithered input video signal, the available shade signal, and the select signal and, under the control of the select signal, adjusts the dithered input video signal to have a value equal to one of the available primary shades. Thus, an input video signal may be dithered with a dither signal that is optimized for dithering an input signal that falls into a particular range of desired shades. That is, a different dither signal may be employed for each possible spacing of adjacent available primary shades. As a result, an overall quantizing transfer function can be achieved which is, on average, linear for all values of the input video signal.

16 Claims, 8 Drawing Sheets

Microfiche Appendix Included
(1 Microfiche, 28 Pages)

(PRIOR ART)

|   7   |   6   |   5   |   4   |   3   |   2   |   1   |   0   |
|-------|-------|-------|-------|-------|-------|-------|-------|
| $I_4$ | $I_3$ | $I_2$ | $I_1$ | $I_0$ |   x   |   x   |   x   |

FIG. 10A

|   5   |   4   |   3   |   2   |   1   |   0   |
|-------|-------|-------|-------|-------|-------|
|  d5   |  d4   |  d3   |  d2   |  d1   |  d0   |

FIG. 10B

|   5   |   4   |   3   |   2   |   1   |   0   |
|-------|-------|-------|-------|-------|-------|
|   0   |   0   |   0   |   0   |  d5   |  d4   |

FIG. 10C

|   5   |   4   |   3   |   2   |   1   |   0   |
|-------|-------|-------|-------|-------|-------|
|   0   |  d5   |  d4   |   0   |   0   |   0   |

WEAK DITHER

FIG. 10D

|   5   |   4   |   3   |   2   |   1   |   0   |
|-------|-------|-------|-------|-------|-------|
|   0   |   0   |   0   |  d5   |  d4   |  d3   |

FIG. 10E

|   5   |   4   |   3   |   2   |   1   |   0   |
|-------|-------|-------|-------|-------|-------|
|  d5   |  d4   |  d3   |   0   |   0   |   0   |

STRONG DITHER

FIG. 10F

METHOD AND APPARATUS FOR ADAPTIVE DITHERING

MICROFICHE APPENDIX

This application is submitted with a microfiche appendix consisting of 1 microfiche with 28 frames.

TECHNICAL FIELD

The present invention is related to dithering in visual displays and, more particularly, to a method and apparatus for selecting a particular predetermined dither signal, based on the value of the input video signal to be dithered, such that contours are avoided in the resulting visual display.

BACKGROUND ART

Quantizing is the process of assigning discrete numbers to variable signals, where all values of the variable signal that are within a particular quantizing interval are assigned the same discrete number. Contouring in display devices is a well-known visual effect caused by a difference between the input video signal and the quantized signal which results when an input video signal is quantized for display on a display device.

Figure 1:
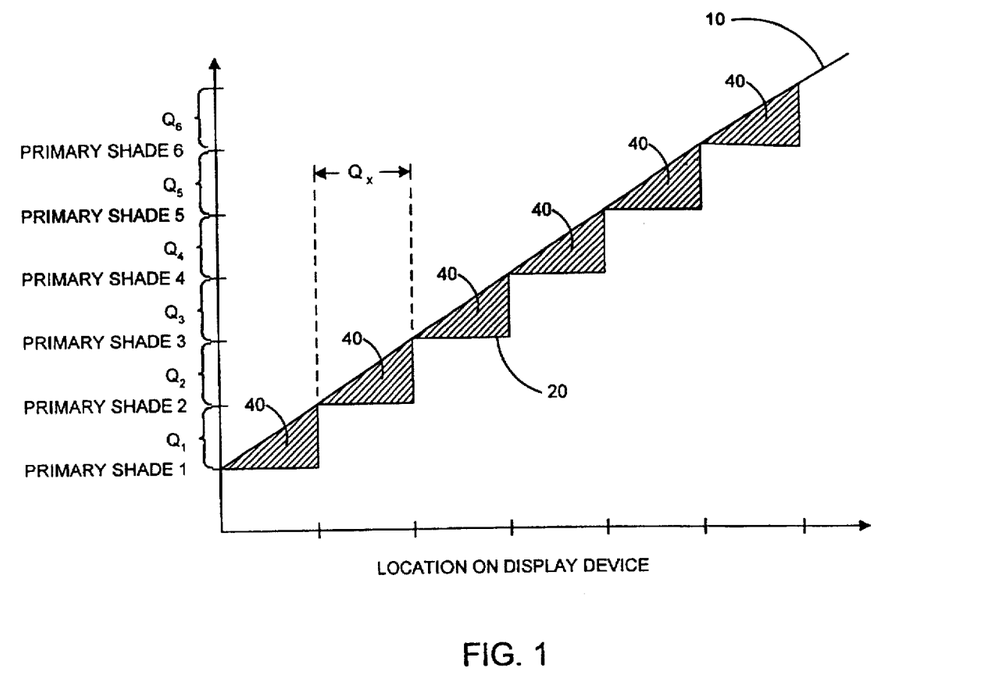
FIG. 1 is a graph illustrating a quantizing process where the available primary shades are evenly spaced.

For example, referring to FIG. 1, it may be desired for a display device to display the shades represented by the amplitude of an input video signal represented by line 10, where the amplitude of the input video signal 10 smoothly varies, to represent a smooth linear variation in shade across the display device. However, most display devices are capable of displaying only discrete "primary" shades. Thus, for each primary shade, a quantizing transfer function is applied to the input video signal 10 such that a particular primary shade is assigned to all shades of the input video signal that are within a particular quantizing interval $Q_r$.

In particular, by applying a non-linear "staircase" quantizing transfer function to the input video signal, a smooth, linearly varying input video signal 10 is replaced by a quantized video signal represented by line 20 which is contoured. That is, a range of amplitudes of the input video signal 10 are represented by a corresponding single primary shade in the quantized video signal 20, so that in quantized video signal 20 one primary shade is used to represent an entire interval $Q_n$ of the input video signal and, in the next quantizing interval $Q_{n+1}$, the quantized video signal 20 suddenly steps to another primary shade.

Figure 2:
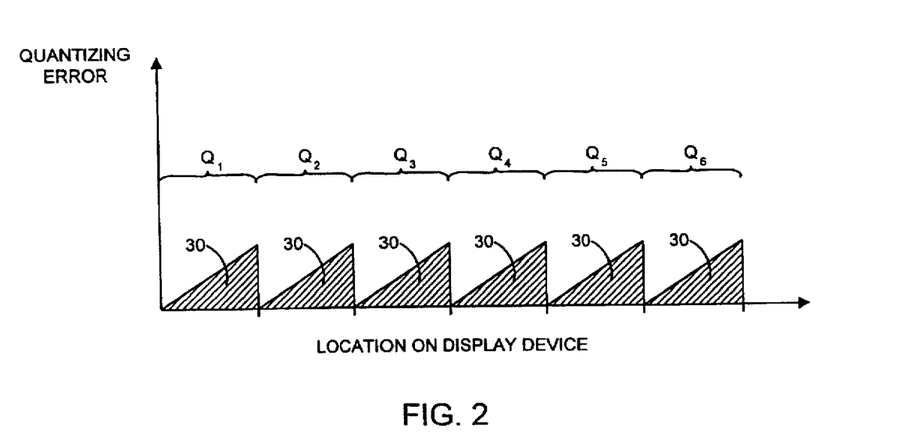
FIG. 2 is a graph illustrating error in the quantizing process of FIG. 1.

FIG. 2 shows the error in the quantized video signal 20 relative to the smooth linearly varying input video signal 10. This quantizing error manifests itself as a "sawtooth" function 30. Within each quantizing interval $Q_r$, the magnitude of the error (shown by the shaded regions 40, FIG. 1) in the quantized video signal 20 is highly correlated to the value of the input video signal 10.

Figure 3:
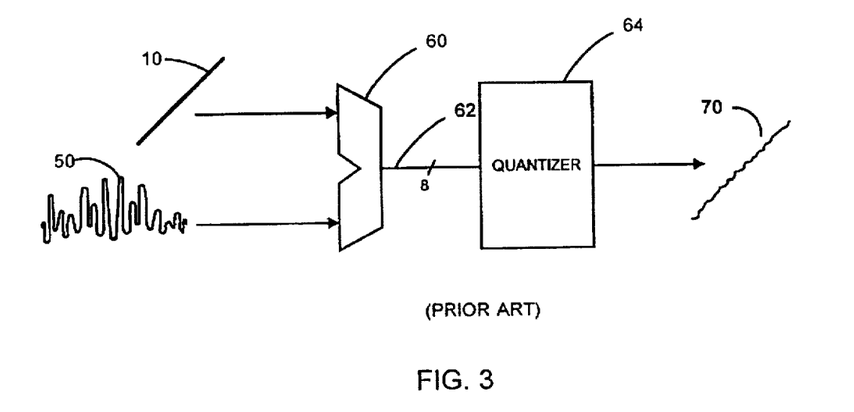
FIG. 3 is a conventional apparatus for dithering.

Dithering is a well-known technique for reducing the contouring caused by the staircase quantizing transfer function by decorrelating the quantizing error from an input video signal. In particular, as shown in FIG. 3, to decorrelate the quantizing error from the input video signal 10, a combiner 60 combines a dither signal 50, representing a well-controlled level of noise, with the input video signal 10 to produce a dithered input video signal 62. Then, it is the dithered input video signal that is quantized (e.g., by a quantizer 64) to produce a quantized dithered input video signal 70.

Thus, as can be seen from the quantized dithered input video signal 70, combining the dither signal 50 with the input video signal 10 converts the correlation of the quantizing error to the input video signal 10, which is subjectively unacceptable, into a more benign correlation of the quantizing error to the noisy dither signal 50. In effect, the correlation of the quantizing error to the noisy dither signal 50, on average, linearizes the transfer function of the quantizer 64.

Conventionally, a single predetermined dither signal is used. An optimum dither signal is one whose parameters (e.g., peak-to-peak amplitude, amplitude probability distribution function, and spectral content) are such that the resultant quantizing transfer function is, on average, linear for all desired shades represented by the input video signal.

However, in some cases, there is no single, predetermined, dither signal that results in a quantizing transfer function which is, on average, linear for all desired shades represented by the input video signal. For example, referring back to the input video signal 10 and the quantizing transfer function 20 shown in FIG. 1, it may be preferable in some cases to modify the quantizing transfer function such that no desired shades represented by the input video signal are allowed to transfer into certain "undesirable" primary shades.

A primary shade may be undesirable, for example, because it is created on a passive matrix liquid crystal display panel using a frame modulation technique, and a constituent fundamental frequency of the frame modulation sequence used to create the particular primary shade may be so low that flickering appears. This is a problem particularly with the advent of passive matrix display panels that have relatively fast response times. As another example, with some fast multimedia applications, an object that is to move quickly across a display may not be displayed at all if it were to be represented as a particular primary shade.

Figure 4:
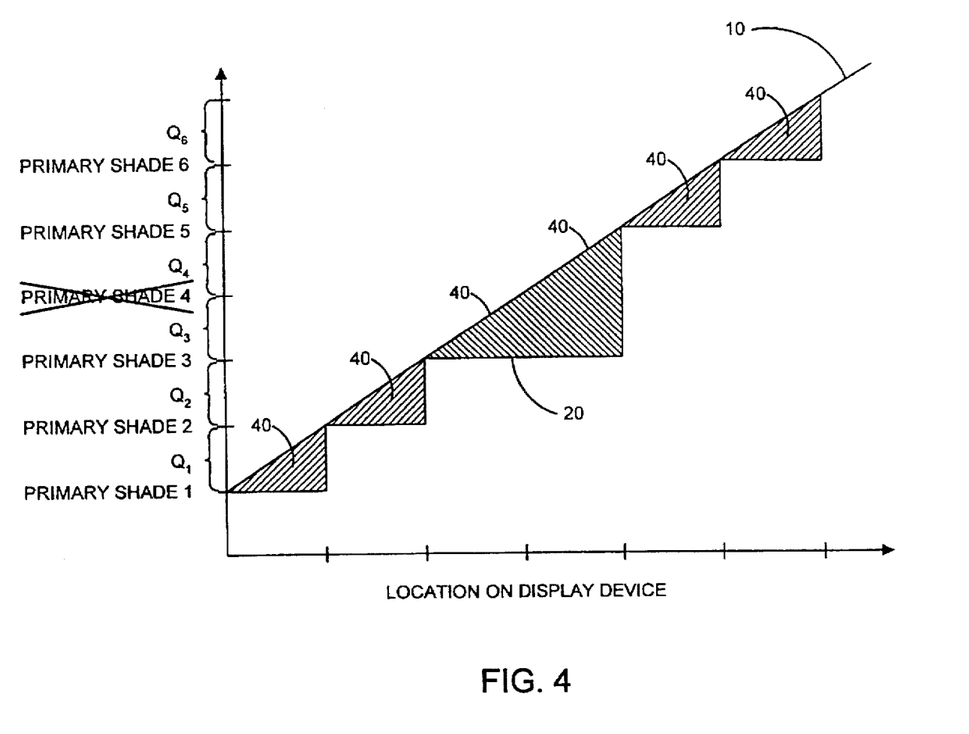
FIG. 4 is a graph illustrating a quantizing process where the available shades are not evenly spaced.

For example, referring to FIG. 4, if primary shade 4 is undesirable, then, without dither, all desired shades represented by input video signal 10 between primary shade 5 and primary shade 3 transfer into primary shade 3. Since primary shade 4 is not allowed, then one quantizing step (i.e. the one between primary shade 3 and primary shade 5) is larger than the other quantizing steps. In such a situation, if the input video signal is combined with a predetermined dither signal, and the predetermined dither signal is optimum for desired shades represented by the input video signal which transfer into the relatively large step between primary shade 3 and primary shade 5, then the predetermined dither signal will add excessive noise to the input video signal when the desired shades are in the other, relatively small, steps between the other primary shades. Conversely, if the predetermined dither signal is optimum for desired shades which transfer to the relatively small steps, then contours will still be evident for quantized values of the input video signal which are in the relatively large step between primary shade 3 and primary shade 5.

SUMMARY

The above and other problems and disadvantages of prior dithering techniques are overcome by the method and apparatus of the present invention which involves analyzing the input video signal as a function of available primary shades and producing a select signal whose value is a function of the desired shade represented by the input video signal and of the available primary shades. A combiner combines the input video signal with a selected one of a plurality of dither signals to generate a dithered input video signal. The one dither signal is selected under the control of the select signal.

Finally, an adjustor receives the dithered input video signal, the available shade information, and the select signal and, under the control of the select signal, adjusts the dithered input video signal to have a value equal to one of the available primary shades.

The present invention provides a method and apparatus for dithering an input video signal with a dither signal that may be optimized for dithering an input signal that falls into a particular range of desired shades. That is, a different dither signal may be employed for each different possible spacing of adjacent available primary shades. Thus, an overall quantizing transfer function can be achieved which is, on average, linear for all values of the input video signal.

DETAILED DESCRIPTION

Figure 5:
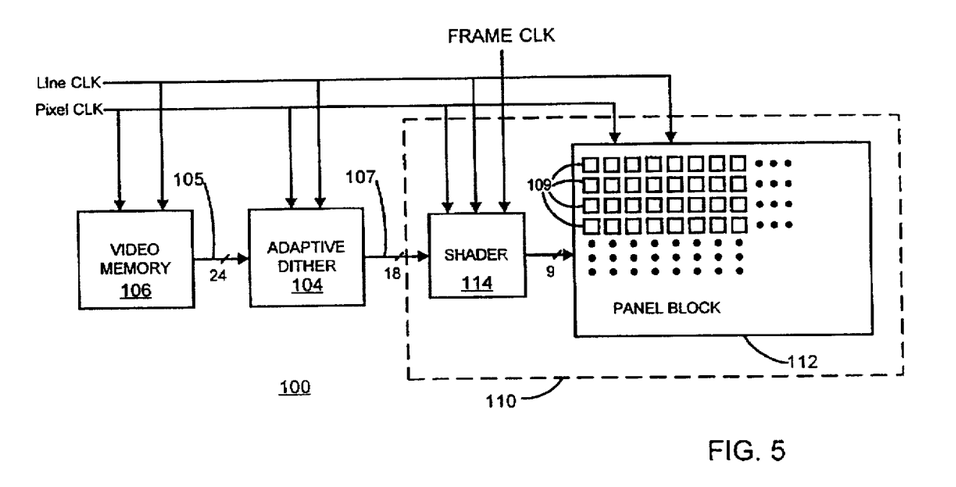
FIG. 5 is a schematic illustration of an example of a video graphics controller which employs an adaptive dithering circuit in accordance with the present invention.

FIG. 5 schematically illustrates a video graphics controller 100 which employs an adaptive dithering circuit 104 in accordance with the present invention. The video graphics controller 100 is otherwise conventional. Referring to FIG. 5, a video memory 106 holds a plurality of input video signals. Each input video signal represents a mixture of desired red, green, and blue (RGB) shades to be displayed by separate pixels 109 of a display device 110. That is, the red, blue, and green shades for each pixel 109 are each represented independently in the video memory 106. As is discussed in detail below, the video memory 106, and the other elements of the video graphics controller, are addressed in common by a line clock, Line Clk, and a pixel clock, Pixel Clk.

The adaptive dithering circuit 104 receives, via an input video data bus 105, an input video signal from the video memory 106, from a location addressed by Line Clk and Pixel Clk. This input video signal represents a desired shade for the particular pixel 109 of the display device 110 then being addressed by Line Clk and Pixel Clk. The adaptive dithering circuit 104 translates the received input video signal into a display device drive signal to drive the display device 110, via a display device drive bus 107, to display the desired shade represented by the input video signal using one of a plurality of available primary shades. For example, the display device 110 may comprise a passive matrix liquid crystal display (LCD) panel 112, and a shader 114 may be employed to generate signals to display the available primary shades on the pixels of the LCD panel 112 using frame modulation techniques, as discussed in the Background. While the available primary shade actually displayed by the particular pixel may not be identical to the desired shade designated by the input video signal, the cumulative effect of the available primary shade displayed by the particular pixel and adjacent pixels will provide the appearance of the desired shade.

Figure 6:
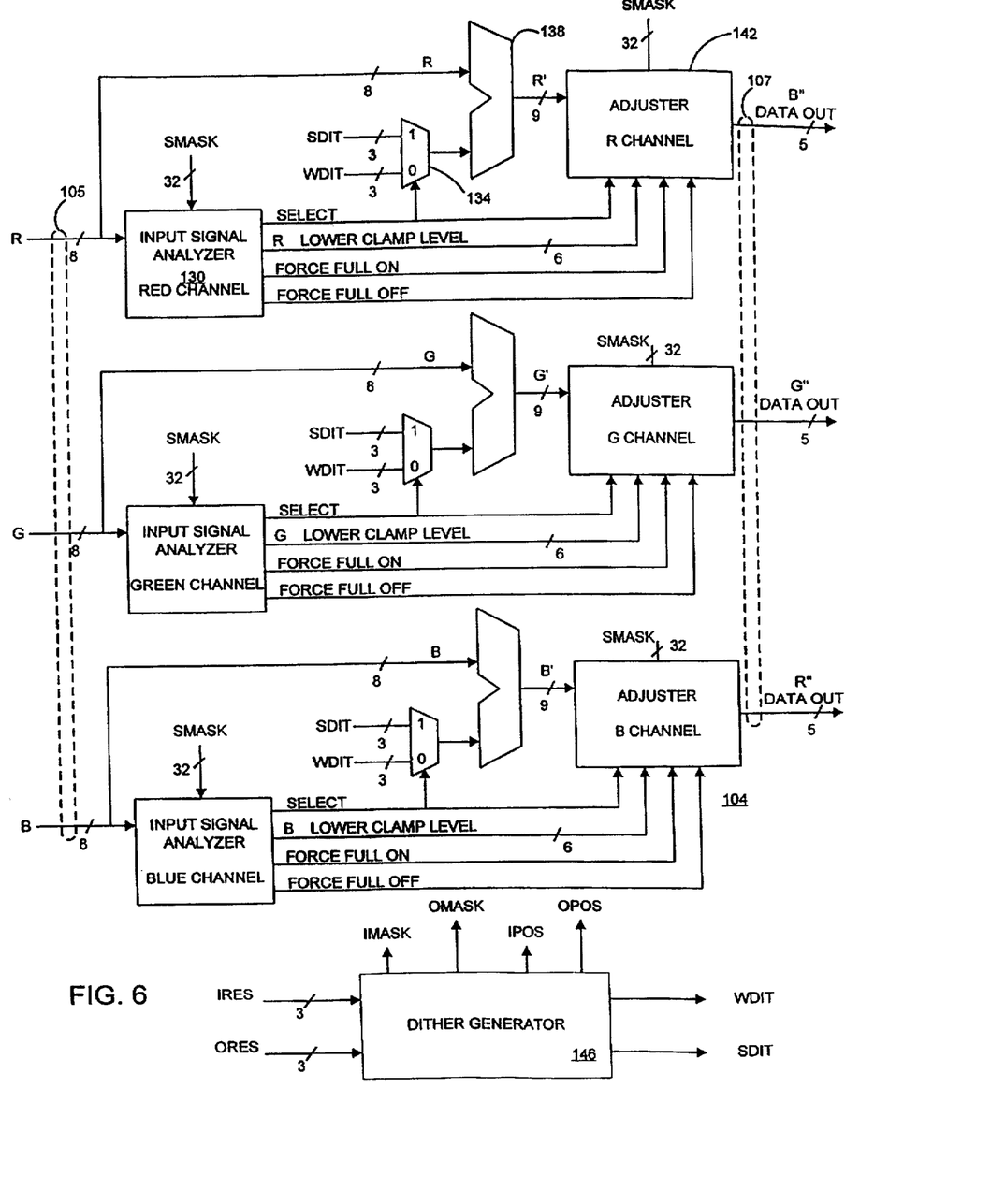
FIG. 6 schematically illustrates the adaptive dithering circuit of the video graphics controller shown in FIG. 5.

FIG. 6 is a schematic illustration of the adaptive dithering circuit 104. An input signal analyzer 130 is adapted to receive the portion of the input video signal, R, which represents the desired red shade. The input signal analyzer 130 is also adapted to receive an available shade signal, SMASK. The available shade signal, SMASK, indicates the values of the available primary shades.

The input signal analyzer 130 produces a select signal, SELECT, whose value is a function of the value of the desired shade relative to the values of the available primary shades.

A data selector 134 receives the select signal, SELECT, and a plurality of dither signals. For example, FIG. 6 shows the data selector 134 receiving two dither signals, SDIT and WDIT. Each of the dither signals, SDIT, WDIT corresponds to a separate one of several possible values of the select signal, SELECT. The data selector 134 selects the dither signal designated by the value of the select signal, SELECT.

A combiner 138 also receives the input video signal, R, and combines the input video signal, R, with the selected dither signal to generate a dithered input video signal, R'. An adjustor 142 receives the dithered input video signal, the available shade signal, SMASK, and the select signal, SELECT. Under the control of the select signal, SELECT, the adjustor 142 adjusts the dithered input video signal, R', to produce an adjusted dithered signal, R", which has a value equal to the value of one of the available primary shades as represented by the available shade signal, SMASK.

Similarly, for each of the green, G, and blue, B, portion of the input video signal, an input signal analyzer, a selector, a combiner and an adjustor translate the desired shade of green and blue respectively into an adjusted dithered signal, G" and B", respectively, corresponding to available primary shades of green and blue, respectively.

Finally, a dither generator 146 is provided to generate the dither signals, SDIT and WDIT. Each of the plurality of dither signals is a function of the allowable spacings of immediately adjacent available primary shades, and a separate dither signal is provided for each possible allowable spacing. For example, in FIG. 4, it can be seen that there are two allowable spacings of immediately adjacent available primary shades (i.e., the "narrow" spacing between primary shade 1 and primary shade 2, between primary shade 2 and primary shade 3, between primary shade 5 and primary shade 6, and between primary shade 6 and primary shade 7, as opposed to the "wide" spacing between primary shades 3 and 5). Thus, for the example of FIG. 4, two possible dither signals are provided: a "strong" dither signal, SDIT, for dithering input video signals that fall into a wide spacing, and a "weak" dither signal, WDIT, for dithering input video signals that fall into a narrow spacing.

To dither an input video signal, R, representing a desired shade in the wide spacing between primary shade 3 and primary shade 5, the input video signal, R, is combined with the "strong" dither signal, SDIT. Otherwise, if the desired shade is outside the region between primary shade 3 and primary shade 5, the input video signal, R, falls into a narrow spacing and is combined with the weak dither signal, WDIT.

As discussed above, if there are more than two allowable spacings, the dither generator 146 will generate an additional dither signal for each of the additional allowable spacings. The number of allowable spacings and the values of the allowable spacings may be a priori determined. Alternately, the dither generator 146 may be provided with the available shade signal, SMASK, from which the dither generator would calculate the allowable spacings of immediately adjacent available primary shades.

Figure 7:
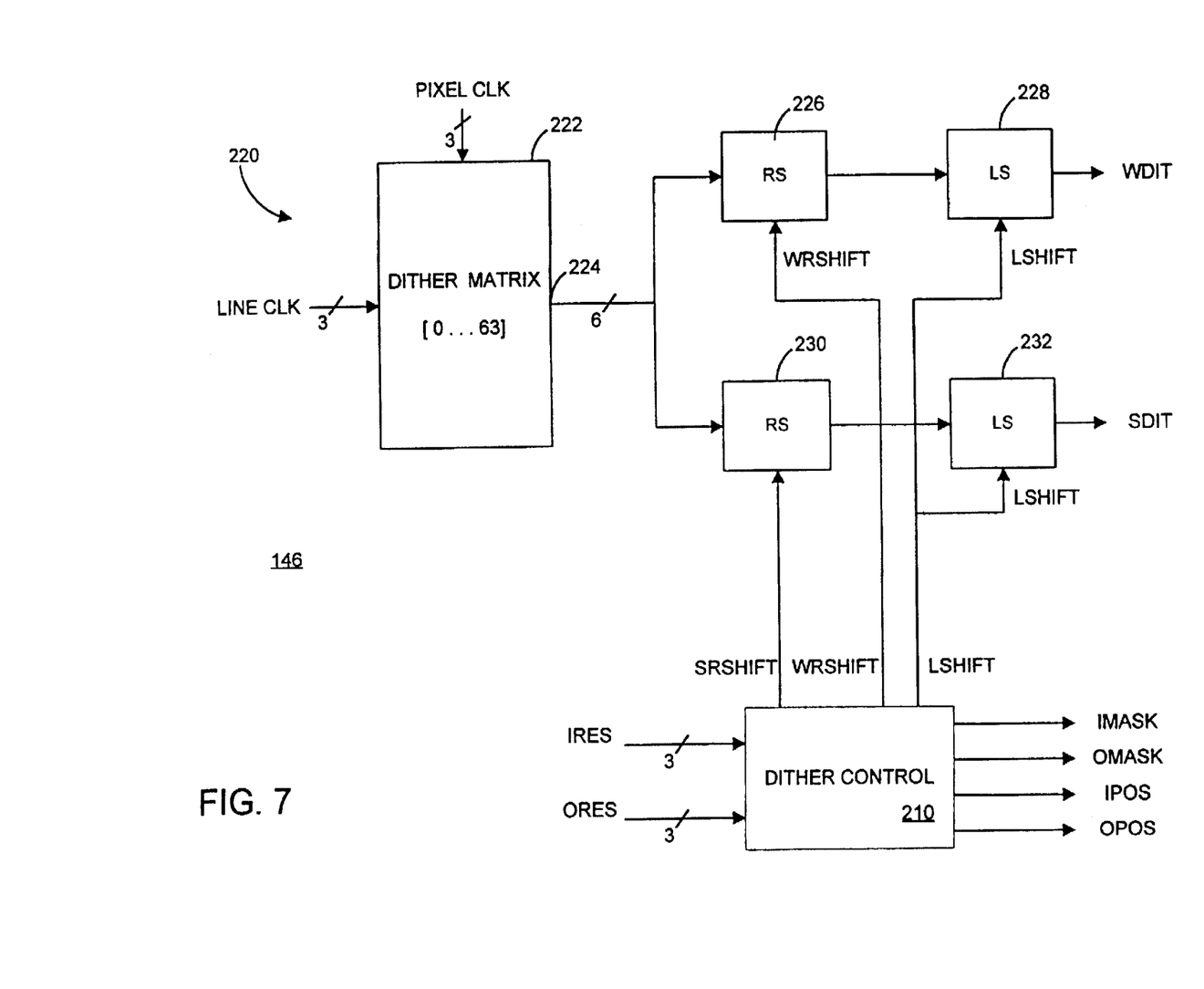
FIG. 7 schematically illustrates the dither generator of the adaptive dithering circuit shown in FIG. 6.
Figure 8:
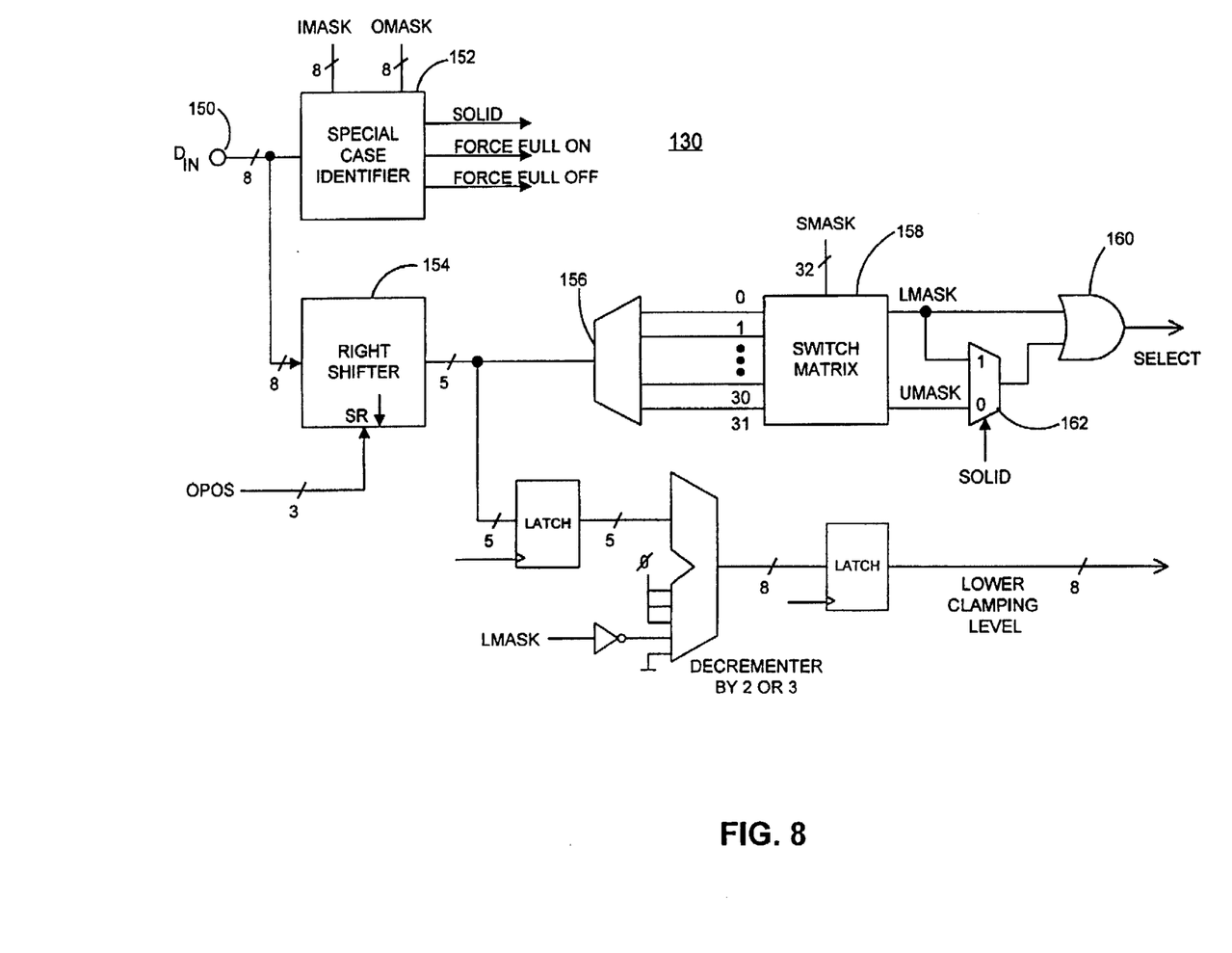
FIG. 8 schematically illustrates the input signal analyzer of the adaptive dithering circuit shown in FIG. 6.
Figure 9:
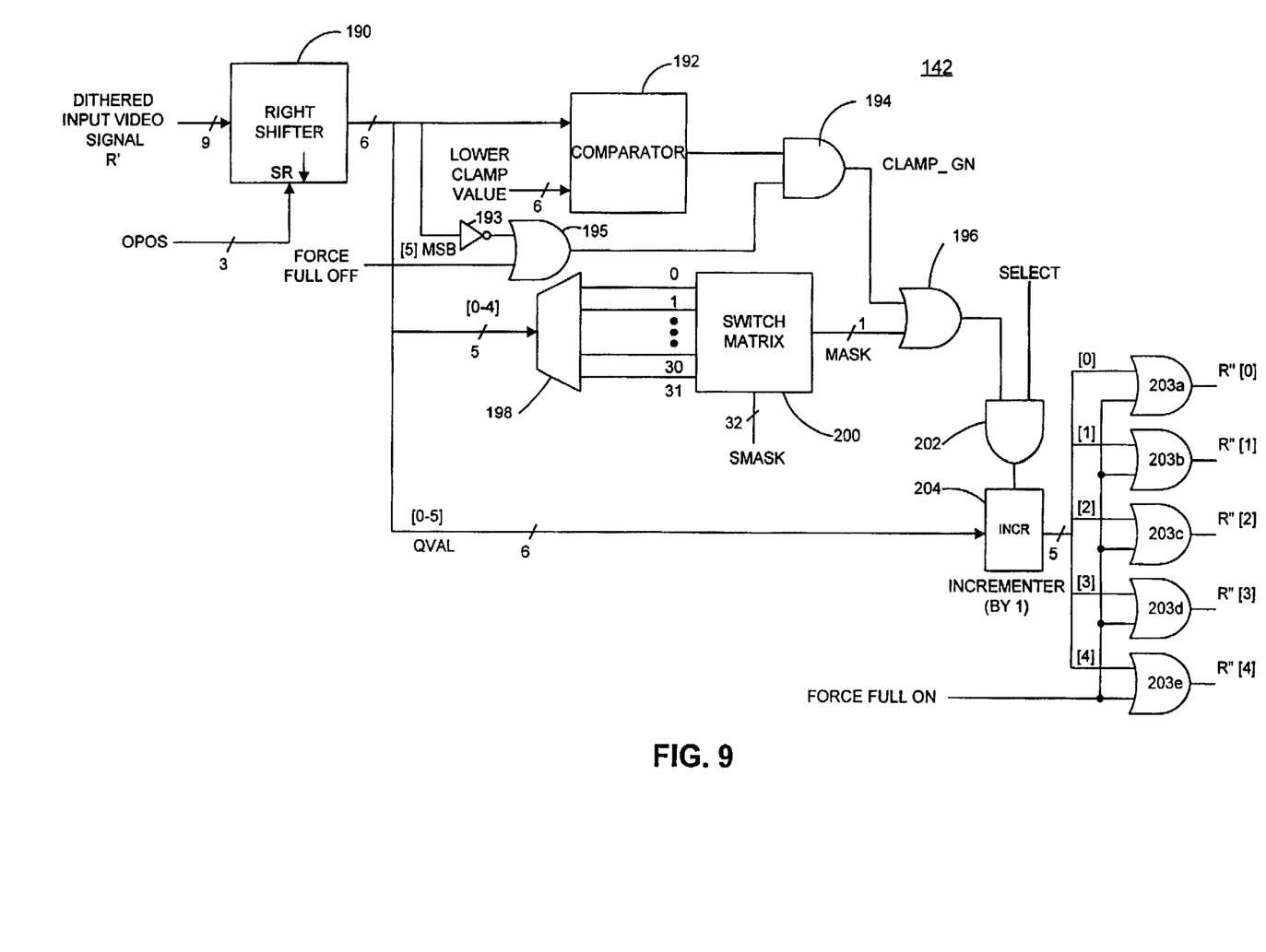
FIG. 9 schematically illustrates the adjustor of the adaptive dithering circuit shown in FIG. 6.

FIGS. 7, 8, and 9 schematically illustrate particular embodiments of the dither generator 146, the input signal analyzer 103, and the adjustor 142, respectively, for a system in which it is a priori determined that there are only two possible allowable spacings, narrow and wide, between adjacent available primary shades.

Referring now to FIG. 7, a dither generation portion 220 of the dither generator 146 generates a weak dither signal, WDIT (for dithering input video signals that represent desired shades which fall into a narrow spacing between adjacent allowable primary shades), and a strong dither signal, SDIT (for dithering input video signals that represent desired shades which fall into a wide spacing between adjacent allowable primary shades). In the described embodiment, the dither signals, WDIT and SDIT, generated by the dither generation portion 220 of the dither generator 146 are expressed in negative, one's complement, form. Thus, the dithering of the input video signal, R, is subtractive.

In general, the weak dither signal, WDIT, is one which would be appropriate for dithering input video signals which are translated into allowable primary shades that are all evenly spaced with the narrow spacing. Conversely, the strong dither signal, SDIT, is one which would be appropriate for dithering input video signals which are translated into allowable primary shades that are all evenly spaced with the wide spacing. Generation of such dither values, for translating input video signals into evenly spaced available primary shades, is well-known in the art and is discussed, for example, on pp. 568-573 of *Computer Graphics: Principles and Practice* (2d Ed), by Foley, van Dam, et al. (Addison-Wesley, 1994).

Before the dither generation portion 220 is discussed in detail, a dither control portion 210 of the dither generator 146, shown in FIG. 7, will be discussed. The dither control portion 210 receives a 3-bit input resolution signal, IRES. The value of IRES indicates the resolution of the desired shade values in the video memory 106 in terms of bits. In particular, in the illustrated embodiment, the input video data bus 105 to the adaptive dithering circuit 104 has three channels, each channel having a channel width of eight bits, for providing the desired shade values for each of the colors red, green, and blue. The desired shade values actually stored in the video memory 106, however, may be represented by a number of bits less than eight. It is this number of bits representing the desired shade values in the video memory 106 that the value of IRES indicates. For example, the actual values of the desired shades stored in the video memory 106 might be represented by only five of the eight available bits. In this case, IRES would be $101_2$. The dither control portion 210 also receives a 3-bit output resolution signal, ORES. The value of ORES indicates the shade resolution of the display device, and defines the display device shade resolution in terms of bits, of the available shade values provided to the display device 110 from the adaptive dithering circuit 104 via the display device drive bus 107.

From the input resolution signal, IRES, the dither control portion 210 generates an input control signal, IMASK, to be used by the adaptive dithering circuit 104 to manipulate the input video signals received from the video memory 106 via the input video data bus 105, FIG. 5. In particular, the bits representing the desired shade values are left-justified within the received input video signals, with the remaining bits of the received input video signals being "don't care" bits. The bits of IMASK that correspond to bits of the desired shade values are set; while the bits of IMASK that correspond to the "don't care" bit positions of the input video signals are cleared. For example, if the desired shade values are designated by only five bits of the input video signal R, the five most significant bits of IMASK are set and the three least significant bits are cleared, to provide a mask word of $11111000_2$. When IMASK is AND'ed with the input video signal, R, the three least significant bits of the input video signal, R, are treated as "don't care" bits and are cleared.

To determine IMASK, first, IRES is subtracted from the channel size (i.e. from eight, the number of bits on the input video data bus that carries the input video signal, R) to determine IPOS, the position of the least significant bit of the desired shade values, where the bit position starts from bit zero. Then, IPOS is decoded into an 8-bit value which has only one bit set, the set bit being in the position of the least significant bit of the desired shade values. Finally, one is subtracted from the decoded IPOS value, and this result is complemented to yield IMASK.

In a similar fashion, from the output resolution signal, ORES, the dither control portion 210 generates two output control signals, OPOS and OMASK.

Three additional dither control signals are generated by the dither control portion 210: weak right shift, WRSHIFT; strong right shift, SRSHIFT; and left shift, LSHIFT.

In particular, referring to FIG. 7, the dither generator portion 220 generates the strong and weak dither signals, SDIT and WDIT, respectively, from a single set of sixty-four 6-bit dither values, stored in a dither matrix memory 222. As described in detail below, the additional dither control signals WRSHIFT, SRSHIFT, and LSHIFT, are employed by the dither signal generation portion 220 of the dither generator 146 to generate the strong and weak dither signals, SDIT and WDIT, from the single set of dither values stored in the dither matrix memory 222.

Alternately, the strong and weak dither signals may be generated, for example, from separate sets of dither values stored in the dither matrix memory 222. In other possible embodiments, the strong and weak dither signals may be generated "on-the-fly" by, for example, well-known random or pseudo-random number generation techniques.

Referring still to FIG. 7, the dither signal generation portion 222 of the dither generator 146 is now described. Responsive to the Line Clk and Pixel Clk, the addressed one of the sixty-four negative-valued dither values is provided to a dither memory output terminal 224. The output dither value is then shifted to be aligned in a particular alignment with the left-justified desired shade value in the input video signal, and the dither signal provided by the dither generator 146 has the shifted output dither value.

In particular, as discussed above, the desired shade values are represented with "IRES" bits, but the output shade values used to drive the display device are represented with "ORES" bits. Since ORES is less than IRES, not all of the "IRES" bits of the desired shade values can be used. The least significant bits of the desired shade values that are dropped can be considered to be a quantizing error. For weak dithering, the output dither signal is aligned with the left-justified desired shade value in the input video signal so that when the aligned dither signal is combined with the desired shade value, the result is the same as the desired shade value but with, at most, only a change in the least significant bit of the bits of the desired shade value that are kept. For strong dithering, the output dither signal is aligned with the left-justified desired shade value in the input video signal so that when the aligned dither signal is combined with the desired shade value, the result is the same as the desired shade value but with, at most, only a change in the two least significant bits of the bits of the desired shade value that are kept.

If there were more than two possible spacings between available primary shades, in some cases, other alignments of the output dither signal with the left-justified desired shade value in the input video signal would be possible. For example, if there were three possible spacings between available primary shades, there would be three possible alignments of the output dither signal with the left-justified desired shade value.

Referring still to FIG. 7, to produce the weak dither signal, WDIT, the dither output signal is right-shifted, by a "weak" right shifter 226, a number of bits indicated by the dither control signal WRSHIFT. The right-shifted value is then left-shifted, by a "weak" left shifter 228, a number of bits indicated by dither control signal LSHIFT, to produce the weak dither signal WDIT. Similarly, to produce the strong dither signal SDIT, the output dither signal is right-shifted, by a "strong" right shifter 230, a number of bits indicated by dither control signal SRSHIFT. The right-shifted value is then left-shifted, by shifter 232, a number of bits indicated by dither control signal LSHIFT.

Figure 10A:
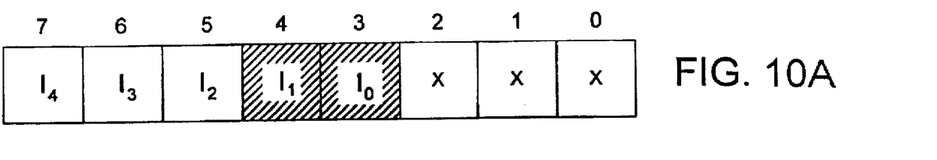
FIG. 10A shows the bit format of the input video signal, R.

The generation of the dither control signals WRSHIFT, SRSHIFT, and LSHIFT, is now discussed with the aid of an example illustrated in FIGS. 10A–10F. First, FIG. 10A shows the bit format of the input video signal, R, that represents a desired shade of red. In the example, it is assumed that the desired shade values are represented by five bits in the input video signals, R, (i.e. bits $I_0$–$I_4$). That is, in the example, it is assumed that IRES is equal to five. As discussed above, and as can be seen from FIG. 10A, the desired shade values are left-justified within the input video signals. Furthermore, in the example, ORES is equal to 2. Thus, bits $I_0$–$I_1$ represent the quantizing error that results from quantizing a desired shade value that falls into a narrow spacing of available primary shades into an available primary shade (i.e. "weak" quantizing error). In FIG. 10A, the weak quantizing error bits are shown shaded with a hatch pattern.

Figure 10B:
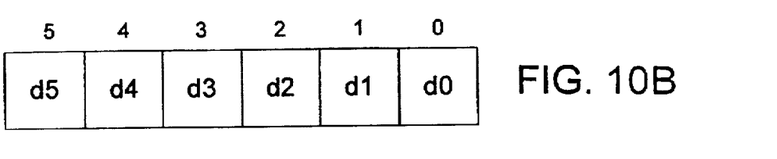
FIG. 10B shows the bit format of a dither value provided at the output terminal 224 of the dither matrix memory 222 of dither generator 146 shown in FIG. 7.

FIG. 10B shows the bit format of a dither signal provided at the output terminal 224 of the dither matrix memory 222.

Figure 10C:
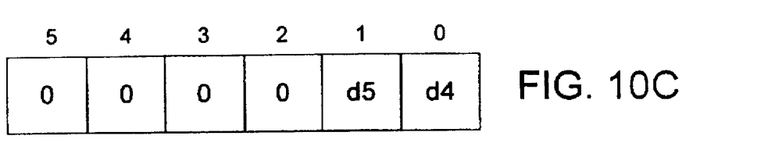
FIG. 10C shows the dither value of FIG. 10B after it has been right-shifted a number of bits indicated by WRSHIFT, by right shifter 226, of dither generator 146 shown in FIG. 7.

FIG. 10C shows the dither signal of FIG. 10B after it has been right-shifted a number of bits indicated by WRSHIFT, by right shifter 226. After being right-shifted, the "n" most significant bits of the dither signal remain, where "n" is the number of bits of weak quantizing error. In particular, WRSHIFT is determined from the formula: WRSHIFT= dither size (i.e. 6)+ORES–IRES. Thus, in the example of FIGS. 10B and 10C, WRSHIFT equals 4.

Figure 10D:
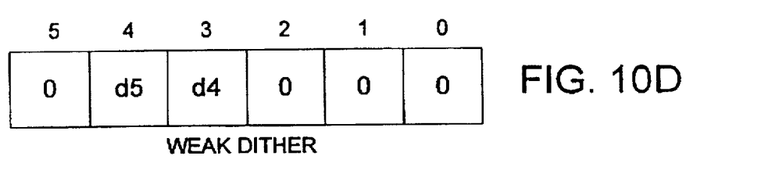
FIG. 10D shows the dither value of FIG. 10C after it has been left-shifted by a number of bits indicated by LSHIFT, by left shifter 228, of dither generator 146 shown in FIG. 7.

FIG. 10D shows the dither signal of FIG. 10C after it has been left-shifted by a number of bits indicated by LSHIFT, by left shifter 228. After being left-shifted, the "n" bits of the dither signal will be aligned with the weak quantizing error bits of the input video signal, R.

Figure 10E:
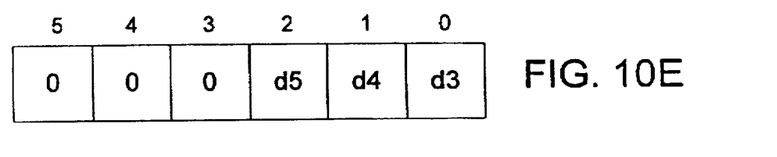
FIG. 10E shows the dither value of FIG. 10B after it has been right-shifted by a number of bits indicated by SRSHIFT, by right shifter 230, of dither generator 146 shown in FIG. 7.

FIG. 10E shows the dither signal of FIG. 10B after it has been right-shifted by a number of bits indicated by SRSHIFT, by right shifter 230. After being right shifted, the "m" most significant bits of the dither signal remain, where "m" is the number of bits of "strong" quantizing error, i.e. the error in quantizing a desired shade value that falls within a wide spacing of available primary shades. For example, in FIG. 10A, bits $I_0$–$I_2$ represent the strong quantizing error in the input video signal, R. SRSHIFT is determined from the formula: SRSHIFT=dither size (i.e. 6)+ORES–IRES–1. Thus, in the example of FIGS. 10B and 10E, SRSHIFT equals 4.

Figure 10F:
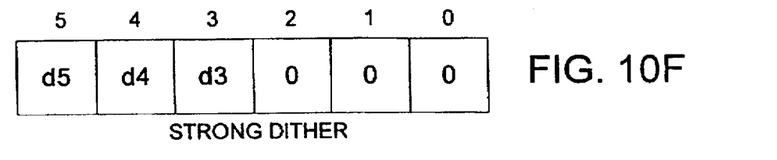
FIG. 10F shows the dither value of FIG. 10E after it has been left shifted by the number of bits indicated by LSHIFT, by left shifter 232, of dither generator 146 shown in FIG. 7.

Finally, FIG. 10F shows the dither signal of FIG. 10E after it has been left shifted by the number of bits indicated by LSHIFT. After being left-shifted, the "m" bits of the dither signal will be aligned with the strong quantizing error bits of the input video signal, R.

In some cases, the strong dither signal SDIT or the weak dither signal WDIT, or both, are effectively disabled. That is, to disable weak and/or strong dithering, a dither signal having a value of FFh is provided as the weak and/or strong dither signal from the dither generator 146 to the combiner 138. Adding a dither signal which always has a value of FFh to an input video signal is equivalent, in one's complement arithmetic, to subtracting zero dither from the input video signal.

Particular cases in which dithering would be disabled are now discussed. First, a value of the ORES signal greater than the value of the IRES signal indicates that linearity of the quantizing transfer function cannot be improved by dithering. Thus, if the value of the ORES signal is greater than the value of the IRES signal, both weak and strong dithering should be disabled.

As another example of a case when dithering should be effectively disabled, if the value of the ORES signal is equal to the value of the IRES signal, this is an indication that weak dithering should be disabled. However, since some primary shades may still be "dropped", strong dithering should not be disabled.

Referring now to FIG. 8, the input signal analyzer 130 receives the 8-bit input video signal, R, from bus 105 at a terminal 150. A special case identifier 152 receives the input video signal R, the input control signal, IMASK, and the output control signal, OMASK. The special case identifier 152 determines the states of two adjustor control signals, FORCE FULL ON and FORCE FULL OFF, used by the adjustor 142 to ensure that, regardless of how a "full on" or "full off" desired shade value is dithered, the resultant output signal used to drive the display device 110 is likewise "full on" or "full off", respectively.

First, by logically combining the input video signal R with IMASK, the special case identifier 152 determines if the desired shade value represented by the input video signal is "full off", i.e. is all zeros. If it is, the FORCE FULL OFF adjustor control output from the special case identifier 152 is asserted. Using the example of FIG. 10A, the FORCE FULL OFF adjustor control output is asserted if bits $R_0$-$R_4$ are all zeros.

Next, the special case identifier 152 likewise determines if the desired shade value represented by the input video signal is "full on", i.e. is all ones. If it is, the FORCE FULL ON output from the special case identifier 152 is asserted. Again using the example of FIG. 10A, the FORCE FULL ON adjustor control output is asserted if bits $R_0$-$R_4$ are ones.

Finally, the special case identifier 152 determines the value of a "SOLID" signal which is used in determining the value of the SELECT signal. In particular, the special case identifier 152 determines if the desired shade value represented by the input video signal R is equal to a primary shade. If it is, the "SOLID" signal is asserted. Again using the example of FIG. 10A, with IRES equal to 6, if ORES is equal to 3, "SOLID" is asserted if bits $R_0$ through $R_2$ (i.e. bits $R_0$ through $R_{ORES-IRES-1}$) are zero.

A right shifter 154 also receives the input video signal, R. The right shifter 154 shifts the input video signal, R, by the number of bits designated by the value of the 3-bit dither control signal, OPOS. The result is the primary shade to which the desired shade value represented by the input video signal, R, would translate, without dithering. That is, it will be recalled that OPOS represents the position of the least significant output bit of the desired shade value. In the FIG. 8 implementation of the input signal analyzer 130, the right-shifted input video signal is output onto a 5-bit bus. Thus, only up to five bits of output resolution can be supported. The right-shifted input video signal can have one of thirty-two values (i.e. $32=2^5$).

A decoder 156 has a 5-bit input to receive the 5-bit right-shifted input video signal. The decoder 156 asserts two of its thirty-two outputs under the control of the 5-bit right-shifted input video signal. In particular, the asserted outputs correspond to 1) a first primary shade, to which the desired shade would be translated absent dithering, and 2) to a second primary shade which is immediately adjacent to, and has a value less than, the first primary shade.

The thirty-two outputs from the decoder 156 are used to address a switch matrix 158. The switch matrix 158 also receives the available primary shade signal, SMASK. In the embodiment of FIG. 8, SMASK is a 32-bit signal. Like the outputs of the decoder 156, each bit of the 32-bit SMASK signal represents a separate primary shade. The primary shades represented by the bits of SMASK are evenly spaced from each other. The bits of SMASK that represent an available primary shade are cleared (i.e., are "0"), and the bits of SMASK that represent a "dropped" primary shade are set (i.e., are "1").

The switch matrix 158 functions to determine if the desired value represented by the input video signal, R, is within a narrow spacing or a wide spacing. In particular, if both of the primary shades surrounding the desired shade are available, then the SELECT signal at the output of OR device 160 is not asserted (so that a "weak" dither is used). Otherwise, the SELECT signal is asserted (so that a "strong" dither is used).

In particular, the switch matrix 158, by comparing the asserted outputs from the decoder 156 to the cleared (shade available) bits of SMASK, indicates first if the primary shade immediately above the primary shade to which the right-shifted input video signal translates (the "upper shade") represents a primary shade which is not available. If the upper shade is not an available primary shade, the binary UMASK output from the switch matrix 158 is asserted. For example, referring to FIG. 4, if the desired shade is between dropped primary shade 4 and available primary shade 5, the UMASK output is not asserted. By contrast, if the desired shade is between available primary shade 3 and dropped primary shade 4, UMASK is asserted.

Likewise, the switch matrix 158 also indicates if the primary shade represented by the right-shifted input video signal (the "lower shade") is one which is not available. If the lower shade is not an available primary shade, the switch matrix 158 asserts the binary LMASK output. Again referring to FIG. 4, if the desired shade is between available primary shade 5 and available primary shade 6, the LMASK output is not asserted. By contrast, if the desired shade is between dropped primary shade 4 and available primary shade 5, the LMASK output is asserted.

The binary LMASK output, the binary UMASK output, and the SOLID signal are used by the input signal analyzer 130 to determine the state of the SELECT signal. Recall that an asserted SOLID signal indicates that the input desired shade corresponds to a primary shade. In this case, lower shade and upper shade are equal. If SOLID is not asserted, indicating that upper shade and lower shade are both possible resultant values, then the SELECT signal is asserted only if either upper shade or lower shade are not available. On the other hand, if SOLID is asserted, indicating that only lower shade is a possible resultant value, then the SELECT signal will be asserted only if the lower shade (or the upper shade, since the upper shade is the same as the lower shade) is not available.

Specifically, a two-input OR device 160 receives LMASK at its first input. Selector 162 receives both UMASK and LMASK as inputs and is controlled by the SOLID signal. If SOLID is not asserted, UMASK is selected as the output of selector 162 to be provided to the second input of the OR device 160. Alternately, if SOLID is asserted, LMASK is selected by the selector 162 to be provided to the second input of the OR device 160. Thus, if SOLID is not asserted and if either LMASK or UMASK are asserted, the SELECT signal at the output of OR device 160 will be asserted. On the other hand, if SOLID is asserted and if LMASK is asserted, the OR device 160 asserts the SELECT signal at its output.

In addition, the input signal analyzer 130 generates a LOWER CLAMPING LEVEL signal. Ideally, after an input video signal is dithered, and the dithered input video signal is translated into an available primary shade, the available primary shade into which the dithered input video signal is translated should not be greater than one available primary shade away from the value to which the input video signal, if not dithered, would be translated. The value of the LOWER CLAMPING LEVEL signal is set to be the value of the primary shade which is one primary shade away from the available primary shade value to which the input video signal, if not dithered, would be translated. The adjustor 142, FIG. 6, used the LOWER CLAMPING LEVEL signal by comparing the value of the LOWER CLAMPING LEVEL signal to the output signal from the combiner 138, FIG. 6, and can thus determine from the value of the LOWER CLAMPING LEVEL signal if the dithered video signal falls outside its allowable range.

Specifically, the LMASK output from the switch matrix 158 being asserted indicates that the lower shade is not an available primary shade. In this case, an analyzer combiner 164 subtracts three from the value of the right-shifted input video signal to generate the LOWER CLAMPING LEVEL signal. That is, lower shade, which is one less than the value of the right-shifted input video signal, is not an available shade. The shade below lower shade, that is, the shade that is two less than the value of the right-shifted input video signal, is an available shade. Since the LOWER CLAMPING LEVEL signal is to indicate the shade that is outside the allowable range of the output signal, the LOWER CLAMPING LEVEL signal is set to three less than the value of the right-shifted input video signal.

Otherwise, if the LMASK output from the switch matrix 158 is not asserted, indicating that the lower shade is an available primary shade, the analyzer combiner 164 subtracts two from the value of the right-shifted input video signal to generate the LOWER CLAMPING LEVEL signal.

In the embodiment shown in FIG. 8, the subtraction by two or three is realized by adding the two's complement of two or three (1Eh and 1Dh, respectively), with the difference between the two values being controlled by the LMASK output.

As discussed above with respect to FIG. 6, a combiner 138 combines the input video signal with the dither signal selected by the data selector 134 to generate a dither input video signal.

Referring now to FIG. 9, the dithered input video signal is provided to the adjustor 142, which adjusts the dithered input video signal to produce an adjusted dithered signal which has a value equal to the value of one of the available primary shades as represented by the available shade signal, SMASK. If the dithered input video signal would translate into an "undesirable" value, then the translated "undesirable" value is adjusted by the adjustor 142 to be a desirable value.

For example, if the dithered input video signal would translate into a negative-valued primary shade, then the translated value would be forced to be zero (i.e. "full off") or, if the translated value would be outside an allowable range of output values, then the translated value would be incremented to the next allowable primary shade. As another example, if the desired input video signal would translate into a value which represents an unavailable primary shade, then the translated value would be incremented to be a value which represents an available primary shade.

Referring still to FIG. 9, the dithered input video signal is provided to a right shifter 190 of the adjustor 142. The right shifter 190, functioning in a fashion similar to the right shifter 154 of the input signal analyzer 130, shifts the dithered input video signal by the number of bits designated by the 3-bit output position data word OPOS, "zero filling" from the left as it shifts, to generate a translated dithered input video signal. In contrast to the right shifter 154 of the input signal analyzer 130, which provides a 5-bit output, the right shifter 190 of the adjustor 142 provides a 6-bit output.

The most significant bit of the translated dithered input video signal is a carry out bit. In the example of FIG. 9, the most significant bit is bit 5, out of bits 0 through 5. This most significant bit is provided to an inverter 193. If this most significant bit is cleared, indicating that the dithered input video signal translates into a negatively-valued primary shade, the output of the inverter 193 is asserted. The output of the inverter is provided to the first input of a two-input OR device 195. The FORCE FULL ON adjustor control signal is provided from the input signal analyzer 130 to the second input of the OR device 195. The output of the OR device 195 is provided to the first input of a two-input AND device 194.

Meanwhile, a comparator 192 compares the translated dithered input video signal to the LOWER CLAMPING LEVEL signal generated by the input signal analyzer 130, and the result of this comparison is provided to the second input of the AND device 194.

Thus, if dithered input video signal is negative or the input video signal was recognized by the special case identifier 152 of the input signal analyzer 130 as being "full off", and the dithered input video signal is equal to the LOWER CLAMPING LEVEL, the CLAMP_GN output of the AND device 194 is asserted. The CLAMP_GN output is connected to one input of a two-input OR device 196.

A decoder 198 also receives bits 0 through 4 of the right-shifted dithered video signal from the right shifter 190. Decoder 198 asserts one of its thirty-two outputs under the control of the 5-bit right shifted dither video signal. A switch matrix 200 receives a decoded output from the decoder 198 and also receives the available shade signal, SMASK. If the right shifted dithered video signal translates into an unavailable primary shade, a MASK output from the switch matrix 200 is asserted. The MASK output is connected to the other input of OR device 196.

The output of the OR device 196 is connected to the first input of an AND device 202. The second input of the AND device 202 is the SELECT signal from the input signal analyzer 130, FIG. 8. The output of the AND device controls an incrementer 204. Thus, if both the SELECT signal and the output from the OR device 196 are asserted, then the incrementer 204 increments the right shifted dithered input signal by one. Otherwise, the right shifted dithered input signal is provided from the incrementer 204 unchanged.

Finally, the five bits of the right-shifted (and, perhaps, incremented) dithered input signal are separately provided to the first input of each of a series of five two-input OR devices, 203a through 203e. The FORCE FULL ON adjustor control signal is provided to the other input of each of the two-input OR devices, 203a through 203e. The outputs of the OR devices, 203a through 203e, are provided from the adjustor 142, to the display device 110, as the adjusted dithered input video signal R". Thus, if the input video signal was recognized by the special case identifier 152 of the input signal analyzer 130 as being "full on", the adjusted dithered input video signal R" provided to the display device 110 is forced to also be "full on" (i.e., all ones). Otherwise, the output of the incrementer 204 is passed through the OR devices, 203a through 203b, and provided from the adjustor 142 as the adjusted dithered input video signal R".

The adaptive dithering circuit can be constructed in hardware, as shown in the figures, or it can be a software program. A listing of a software program to accomplish the adaptive dithering operation is attached herewith as Exhibit A.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A dithering circuit for providing to a display device a dithered output signal based on an input video signal, said display device comprising a plurality of pixels, each pixel capable of being displayed in one of a set of available shades, the input video signal representing a desired shade, the dithering circuit comprising:

an input signal analyzer to receive the input video signal and to produce a select signal as a function of the desired shade and the available primary shades;

a dither generator to generate a plurality of dithering signals;

a combiner circuit to select one of the dithering signals based on the select signal and to combine the input video signal with the selected dithering signal to generate a dithered input video signal; and an adjustor to receive the dithered input video signal and to generate the dithered output signal by adjusting the dithered input video signal to one of the available primary shades.

2. The dithering circuit of claim 1, wherein the input signal analyzer receives an available primary shade signal representative of the available primary shade.

3. The dithering circuit of claim 1, wherein the adjustor adjusts the dithered input video signal under the control of the select signal.

4. The dithering circuit of claim 1, wherein each of the input video signal, the available shades, the desired shade, and the dithered output signals have a value.

5. The dithering circuit of claim 1, wherein the input signal analyzer includes means for determining from the available primary shade signal the values of the available primary shades immediately adjacent to the desired shade;

means for determining the difference between the values of the available primary shades immediately adjacent to the desired shade; and means for producing the select signal as a function of the magnitude of the difference between the values of the immediately adjacent shades.

6. The adaptive dithering circuit of claim 5, wherein the input signal analyzer further includes means responsive to the input video signal and the available primary shade signal for determining an allowable local range and wherein the adjustor further includes means responsive to the determined allowable local range for adjusting the dithered input video signal to be within the allowable local range.

7. The adaptive dithering circuit of claim 1, wherein the adjustor further includes means for adjusting the dithered input signal to be within an allowable global range.

8. A video display interface circuit that provides a signal to drive a display device, the interface circuit comprising:

a video memory to provide an input video signal representing a desired shade;

an adaptive dithering circuit to receive the input video signal from the video memory and to provide a dithered output signal, the adaptive dithering circuit comprising:

an input signal analyzer to receive the input video signal from the video memory and to receive an available primary shade signal, the available primary shade signal corresponding to the values of available primary shades, and to produce a select signal whose value is a function of the value of the desired shade relative to the values of the available primary shades;

means for combining the input video signal with a selected one of a plurality of dither signals to generate a dither input video signal;

an adjustor to receive the dithered input video signal, the available primary shade signal, and the select signal and, under the control of the select signal, to adjust the dithered input video signal to have a value equal to the value of one of the available primary shades, and to provide the adjusted dither input video signal as the dithered output signal, whereby the video display interface circuit translates the video signal into a dithered video signal that designates shades from a set of predetermined available primary shades to drive the display device to display an image with only the available primary shades but having the appearance of being displayed with the desired shade.

9. A method for providing to a display device a dithered output signal based on an input video signal, said display device comprising a plurality of pixels, each pixel capable of being displayed in one of a set of available shades, the input video signal representing a desired shade, the method comprising:

analyzing the input video signal to produce a select signal as a function of the desired shade and the available primary shades;

generating a plurality of dithering signals;

selecting one of the dithering signals based on the select signal and combining the input video signal with the selected dithering signal to generate a dithered input video signal; and generating the dithered output signal by adjusting the dithered input video signal to one of the available primary shades.

10. The method of claim 9, wherein the analyzing step includes receiving an available primary shade signal representative of the available primary shades.

11. The method of claim 9, wherein the dithered input video signal is adjusted under the control of the select signal in the adjusting step.

12. The method of claim 9, wherein each of the input video signal, the available shades, the desired shade, and the dithered output signals have a value.

13. The method of claim 9, wherein the analyzing step includes determining from the available primary shade signal the values of the available primary shades immediately adjacent to the desired shade;

determining the difference between the values of the available primary shades immediately adjacent to the desired shade; and producing the select signal as a function of the magnitude of the difference between the values of the immediately adjacent shades.

14. The adaptive dithering circuit of claim 13, wherein the analyzing step further includes determining an allowable local range responsive to the input video signal and the available primary shade signal, and wherein the adjusting step includes adjusting the dithered input video signal to be within the allowable range, responsive to the determined allowable local range.

15. The adaptive dithering circuit of claim 9, wherein the adjusting step further includes adjusting the dithered input signal to be within an allowable global range.

16. A method of providing a signal to drive a display device, the method comprising:

providing an input video signal representing a desired shade;

receiving the input video signal from the video memory and providing a dithered output signal, the receiving and providing step comprising:

receiving the input video signal and an available primary shade signal, the available primary shade signal corresponding to the values of available primary shades, and producing a select signal whose value is a function of the value of the desired shade relative to the values of the available primary shades;

combining the input video signal with a selected one of a plurality of dither signals to generate a dither input video signal;

receiving the dithered input video signal, the available primary shade signal, and the select signal and, under the control of the select signal, adjusting the dithered input video signal to have a value equal to the value of one of the available primary shades; and providing the adjusted dither input video signal as the dithered output signal, whereby the input video signal is translated into a dithered video signal that designates shades from a set of predetermined available primary shades to drive the display device to display an image with only the available primary shades but having the appearance of being displayed with the desired shade.

* * * * *

UNITED STATES PATENT AND TRADEMARK OFFICE
CERTIFICATE OF CORRECTION

PATENT NO : 5,712,657
DATED : 1/27/98
INVENTOR(S): Alexander Eglit et al.

It is certified that error appears in the above-identified patent and that said Letters Patent is hereby corrected as shown below:

Title page, item [75], the second inventor, "Robin Sungsop Han" should be changed to --Robin Sungsoo Han--.

Signed and Sealed this

Thirty-first Day of March, 1998

Attest:

BRUCE LEHMAN

Attesting Officer

Commissioner of Patents and Trademarks